(12) United States Patent
Peacock et al.

(10) Patent No.: US 7,503,594 B2
(45) Date of Patent: Mar. 17, 2009

(54) EXPANDING HOLLOW METAL RINGS

(75) Inventors: Harold B. Peacock, Evans, GA (US); Kenneth J. Imrich, Grovetown, GA (US)

(73) Assignee: Westinghouse Savannah River Company, Aiken, SC (US)

( * ) Notice: Subject to any disclaimer, the term of this patent is extended or adjusted under 35 U.S.C. 154(b) by 13 days.

(21) Appl. No.: 10/937,093

(22) Filed: Sep. 9, 2004

(65) Prior Publication Data

US 2005/0052025 A1    Mar. 10, 2005

(51) Int. Cl.
*F16K 17/38* (2006.01)

(52) U.S. Cl. .................. 285/381.1; 137/79; 137/468; 137/67

(58) Field of Classification Search ............. 285/381.1, 285/94, 381.5, 905; 137/79, 80, 81.1, 225, 137/468, 67
See application file for complete search history.

(56) References Cited

U.S. PATENT DOCUMENTS

| | | | | |
|---|---|---|---|---|
| 829,546 | A * | 8/1906 | Schou | 277/538 |
| 1,966,202 | A * | 7/1934 | Pfefferle | 285/374 |
| 2,241,086 | A * | 5/1941 | Gould | 62/223 |
| 2,662,550 | A * | 12/1953 | Meyer | 251/11 |
| 2,884,866 | A * | 5/1959 | Patterson | 417/379 |
| 2,914,350 | A * | 11/1959 | Smith | 285/187 |
| 3,088,758 | A * | 5/1963 | Brown | 285/187 |
| 3,383,125 | A * | 5/1968 | Stanley et al. | 285/94 |
| 3,520,543 | A * | 7/1970 | Scherer, Jr. et al. | 277/645 |
| 3,890,994 | A * | 6/1975 | Olsen | 137/67 |
| 3,892,437 | A * | 7/1975 | Makinen | 294/98.1 |
| 4,072,159 | A * | 2/1978 | Kurosawa | 137/67 |
| 4,142,594 | A * | 3/1979 | Thompson et al. | 175/59 |
| 4,179,320 | A * | 12/1979 | Midgley et al. | 156/86 |
| 4,267,853 | A * | 5/1981 | Yamaguchi et al. | 137/67 |
| 4,396,199 | A * | 8/1983 | Boyd et al. | 277/637 |
| 4,555,981 | A | 12/1985 | McCabe | |
| 4,685,683 | A * | 8/1987 | Hall et al. | 277/314 |
| 4,709,948 | A * | 12/1987 | Archer et al. | 285/381.1 |
| 4,732,553 | A * | 3/1988 | Hofer | 425/116 |
| 4,744,572 | A * | 5/1988 | Sahba et al. | 277/641 |
| 4,797,232 | A | 1/1989 | Aubert | |
| 5,033,775 | A * | 7/1991 | Matte et al. | 285/133.11 |

(Continued)

FOREIGN PATENT DOCUMENTS

JP    61-096264    5/1986

*Primary Examiner*—David E Bochna
(74) *Attorney, Agent, or Firm*—John B. Hardaway, III; Joseph T. Guy; Nexsen Pruet, LLC

(57) ABSTRACT

A sealing device that may expand more planar dimensions due to internal thermal expansion of a filler material. The sealing material is of a composition such that when desired environment temperatures and internal actuating pressures are reached, the sealing materials undergoes a permanent deformation. For metallic compounds, this permanent deformation occurs when the material enters the plastic deformation phase. Polymers, and other materials, may be using a sealing mechanism depending on the temperatures and corrosivity of the use. Internal pressures are generated by either rapid thermal expansion or material phase change and may include either liquid or solid to gas phase change, or in the gaseous state with significant pressure generation in accordance with the gas laws. Sealing material thickness and material composition may be used to selectively control geometric expansion of the seal such that expansion is limited to a specific facing and or geometric plane.

9 Claims, 3 Drawing Sheets

U.S. PATENT DOCUMENTS

| | | |
|---|---|---|
| 5,294,133 A | 3/1994 | Dutta |
| 5,365,963 A * | 11/1994 | Hoffmann .................... 137/67 |
| 5,461,185 A | 10/1995 | Forsberg et al. |
| 5,494,863 A | 2/1996 | Mathur |
| 6,145,531 A * | 11/2000 | Cazenave et al. ............. 137/79 |
| 6,329,310 B1 * | 12/2001 | Peuchert et al. ............... 501/66 |
| 6,336,510 B1 * | 1/2002 | Gadini ........................ 169/37 |
| 6,530,574 B1 * | 3/2003 | Bailey et al. ................. 277/314 |
| 6,540,190 B2 | 4/2003 | Keshavjee |
| 6,547,250 B1 * | 4/2003 | Noble et al. ................. 277/309 |
| 6,584,940 B1 | 7/2003 | Khadkiker et al. |
| 6,601,852 B1 * | 8/2003 | Kogler et al. ............... 277/314 |
| 6,905,125 B2 * | 6/2005 | Shibata et al. .............. 277/626 |
| 6,916,024 B2 * | 7/2005 | Hanashima et al. ......... 277/602 |
| 6,948,715 B2 * | 9/2005 | Taylor et al. ................ 277/603 |

* cited by examiner

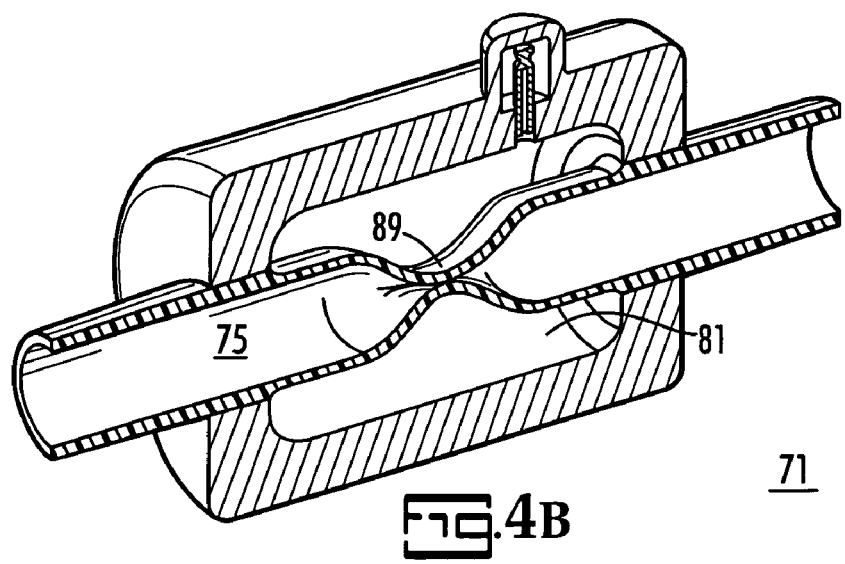
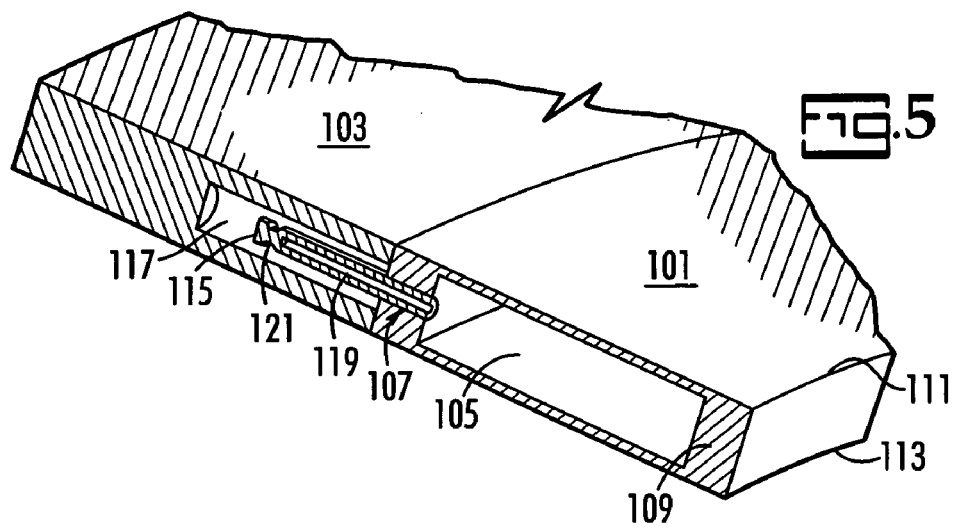
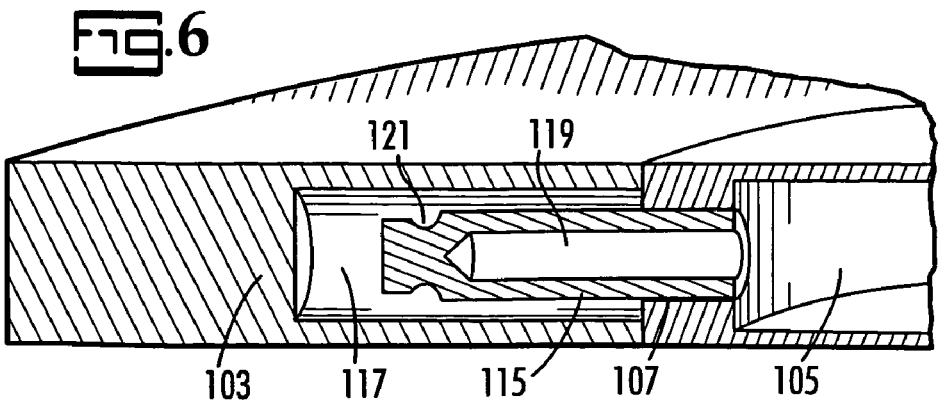

EXPANDING HOLLOW METAL RINGS

This invention was made with United States Government support under Contact No. DE-AC09-96SR18500 awarded by the United States Department of Energy. The Government has certain rights in the invention.

BACKGROUND OF THE INVENTION

1. Field of the Invention

This invention relates to thermally expandable solid structures having hollow sealed cores containing an expandable material which may expand at the same or different rates on opposite sides of the structure depending on design geometry. The rings are useful as seals or gaskets and other configuration may be used as passive regulator devices or shut-off devices and as inserts in pipes and tubes. They are especially useful in heated environments and especially at high temperatures.

2. Background and Prior Art

Gaskets are used to fill spaces between surfaces. As such, they must be flexible and expand or shrink under the same conditions as the mated surfaces. In some cases a filler in an essentially round or oval cross-section of flexible material is used. Most commonly the filler is air such as in the gasketing around an exterior passage door of a building.

U.S. Pat. No. 5,294,133 to Dutta discloses an o-ring useful in a cylinder bore which is an elastomer filled with a fluid such as a mixture of water and glycol to maintain a seal at low temperatures.

Japanese Kokai Showa 61-096264 discloses a metal gasket in the form of a spiral lock washer that is a thin-walled tube filled with a metal having a low melting point which expands upon melting. The gasket is intended for high temperature uses.

The disposal of radioactive waste material is an acute problem world-wide that presents technical and political challenges. Not only do the wastes—especially actinides—have long half-lives and high energy emissions, they often appear in chemical forms which are unfriendly to mammals and materials. One approach to the isolation of radioactive waste has been incorporation into glass logs. U.S. Pat. No. 4,797,232 to Aubert, U.S. Pat. No. 5,461,185 to Forsberg et al., and U.S. Pat. No. 5,494,863 are representative of patents directed to methods for incorporating radioactive waste into glass logs.

Thermally actuated valves have been based upon convection (U.S. Pat. No. 6,584,940), expansion of gas behind a diaphragm (U.S. Pat. No. 6,540,190) or employment of a bimetallic element to control a low-mass flap (U.S. Pat. No. 4,555,981). Cut-off (or turn-on) valves for fire protection typically employ fusible links in accordance with the requirements of 29 CFR 1910.1016(b)(4)(iv)(c)(OSHA) and National Fire Protection Association standards. Reliable alternatives that do not require exposed components are desirable.

BRIEF DESCRIPTIONS OF THE INVENTION

It is an objective of this invention to provide a thermally expansive device which can be used to lock a component into position in a hot environment without recourse to screw threads, keyways or set-screws. It is a further objective of this invention to provide a thermally responsive device to modulate the flow of a fluid or to serve as a reversible or an irreversible shut-off valve in conditions of overheating. It is a further objective to provide a face seal that is thermally responsive and durable. Thermally reversible or irreversible seals are useful for joining pipes as an alternative to swaging and as plugs in boiler tubes and heat exchangers. These and other objectives may be achieved by a sealed structure, polymeric or metallic, which contains a space for a fluid and which has at least one side or arc which has a difference in rigidity than the remaining sides or arcs.

BRIEF DESCRIPTION OF THE DRAWINGS

FIG. 4B shows the spool or sphincter valve in the closed position.

FIG. 5 shows a cutaway of an O-ring face seal according to another embodiment of this invention.

FIG. 6 is a detail showing the fill stem to a void as sealed by pinch welding.

DETAILED DESCRIPTION OF THE INVENTION

The invention takes advantage of the relationship between the thickness of a wall and its flexibility. Thin walls deform under less pressure than do thick walls of the same material. When a pressure source is placed within a structure and the pressure acts against a thick wall and a thin wall, the thin wall will deform before the thick wall. This physical principle may be employed in numerous inventive ways.

Molten glass can be surprisingly corrosive, especially when it contains other materials such as radioactive waste sludge. In one process, waste is treated with nitric and formic acids, borosilicate frit is added and the gemisch is concentrated. Finally, it is fed to a melter, melted and poured into stainless steel canisters. In the pour, at a temperature of at least 950° C., it is necessary to separate the pour stream from the spout so that a coherent stream can be produced. This is accomplished by locating a "knife edge" (constriction) within the pour spout so that the molten glass stream is detached from the spout during final descent. The area around the "knife edge" has been shown to be a site of repeated irregular wear. Solid inserts used to repair the pour spout do not readily conform to the irregular ovoid shape of the eroded area.

In one embodiment of this invention we have developed an expanding ring insert which fits tightly in the irregularly shaped area of erosion and which readily withstands the temperature and pressure associated with pouring corrosive molten glass.

Figure 1:
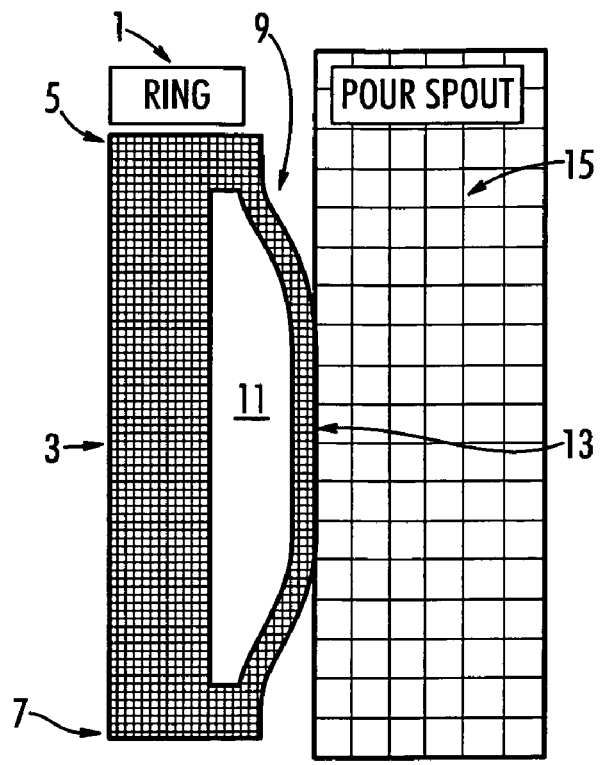
FIG. 1 is a cross-section of a ring according to a first embodiment of the invention.

FIG. 1 shows the structure of the ring 1. The inner portion 3 is cylindrical and thick enough that it resists deformation. Ends 5 and 7 reinforce the inner portion 3 and resist deformation also. Outer wall 9 is much thinner than inner portion 3 or ends 5 and 7. Between outer wall 9 and inner portion 3, capped by ends 5 and 7 is a void space 11. The void space may be filled with a gas such as nitrogen, with a volatile, non-corrosive liquid or with a solid which is volatile. At the temperature of operation of the pour spout, the gas in space 11 expands and forces inner wall 9 into an arcuate shape so that a portion 13 extends significantly beyond a straight line from the respective ends of 5 and 7 and contacts spout 15.

Figure 2:
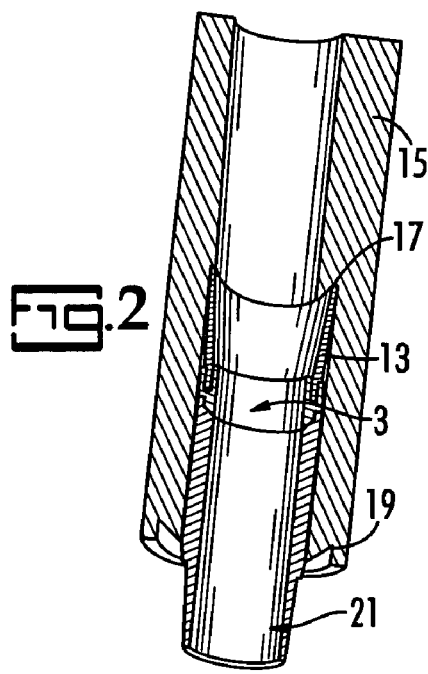
FIG. 2 illustrates the use of the ring of FIG. 1 in a circular pipe.

FIG. 2 shows the fitment of the ring in a pour spout. The spout 15 is notched at 17, the step 19 having formed the original spout, now eroded. The expanded portion 13 contacts a portion of the notch 17 to form a tight seal. In this use, extension 21 of the inner portion 3 of the ring becomes the new "knife edge" to separate the glass flow from the pour spout.

The method for filling the cavity 11 is not critical to the operations of the invention. The easiest method is to have a bore hole into the cavity connected to a solid, preferably metallic stem. Fluid transfers may be made through the stem, which is then sealed by pinch welding or other means such as a threaded insert or cap or a swaged fitting.

The ring is inserted into a pour spout, preferably after surface cleaning and heated to "locking temperatures" prior to pouring.

The expanding ring concept described above may be applied to other situations in which predictable temperature response is required without separate or specialized sensors and external power sources. Application of external heat may be desired if the sealing action is desired above normal operating temperatures.

A passive high temperature shutoff valve involves the use of hermetically sealed gas or liquid filled cavities which, upon exposure to elevated temperatures, expand and create a positive seal to stop a process flow. The process stopped may be passage of any liquid or gas and is especially valuable in stopping the flow of flammable liquids and gasses during a fire. Material of construction varies dependent upon the use environment, corrosivity of the liquid or gas being flowed, the temperature of ordinary use, and the desired shutoff temperature.

Two basic installations may be employed. An in-line spool piece would strangle the flow path. Alternatively, an expanding ring or cylinder could either actuate a valve directly or trigger a pre-loaded shut-off process for a ball, gate or globe valve. Finally, when used in conjunction with a flexible pipe or tubing section, the spool-type device becomes a temperature-sensitive flow restrictor.

Figure 3:
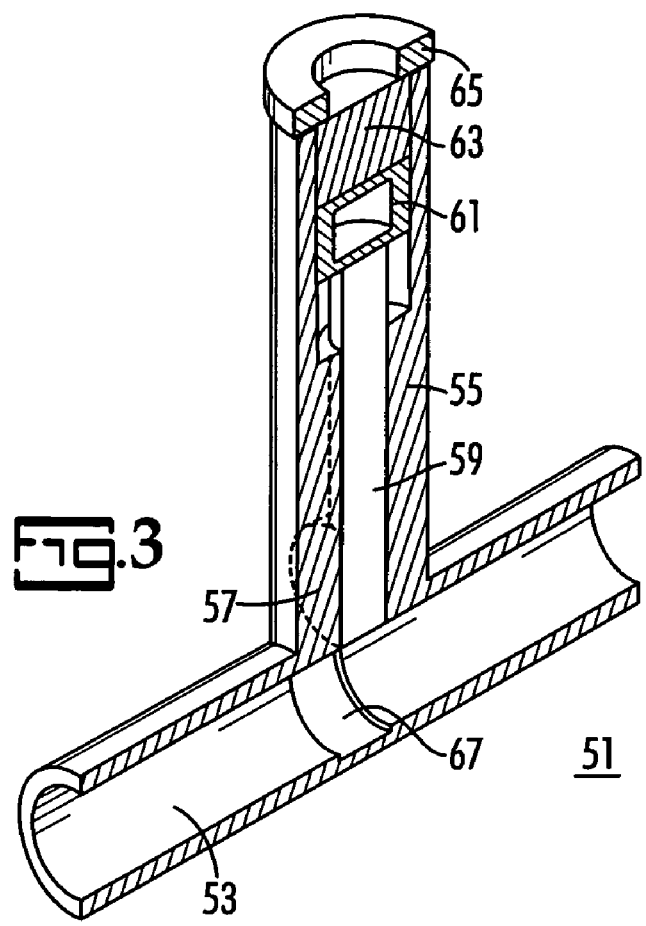
FIG. 3 shows the use of a thermally expansive device according to the invention to activate a gate or globe valve.

FIG. 3 illustrates the use of this invention in a gate valve. The valve 51 includes a section of pipe 53 and a riser 55. The gate head 57 is attached to a stem 59 topped by expanding ring 61. A spacer 63 is shown located between ring 61 and cap 65. When the ring 61 becomes heated, it forces the stem 59 downwardly and pushes the gate 57 into the pipe 53 and preferably into a slight recess 67. The shape of the ring may be varied depending upon the needed length of throw and may be cylindrical to obtain longer movement.

Figure 4A:
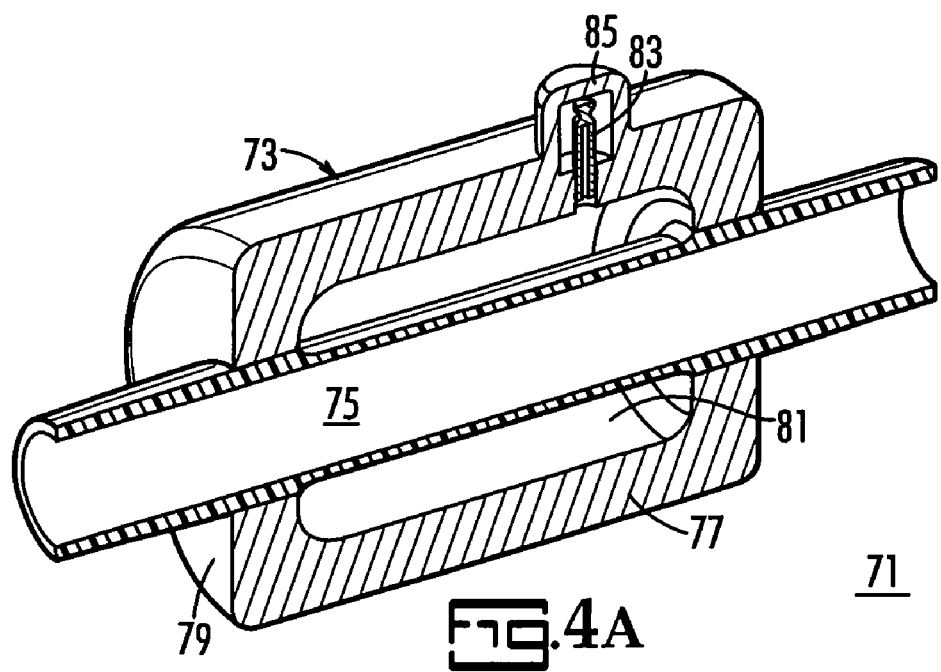
FIG. 4A shows the thermally expansive device according to this invention as a spool or sphincter valve.

FIG. 4A illustrates a spool-type valve 71. The expanding ring 73 surrounds a pipe or tubing section 75. The thick sides 77 and ends 79 together with pipe or tubing section 75 form a cavity 81 which contains the temperature responsive fluid. The figure also illustrates one embodiment of a fill stem. The stem 83 penetrates to the cavity 81 and is sealed with a cap 85 shown welded into place.

FIG. 4B shows the response of the valve 71 to a sensed temperature greater than the set point. As the cavity expands due to expansion of the gas in response to temperature, in accordance with the gas laws, the thin walls of pipe or tubes 75 respond to the increased pressure by collapsing at 89, allowing the fluid in chamber 81 to expand. An aplastic material used in pipe or tube 75 will, once constricted to closure, remain closed, sealing the line in the manner of a shut-off valve. When the pipe or tube is plastic, the constriction at 89 will reopen in response to the diminution of the pressure as the temperature is lowered.

FIG. 5 illustrates the invention in the form of a face seal (O-ring face seal). The surface seal has an inner ring 101 and an outer ring 103. In the embodiment shown, the inner ring 101 has a void space 105, inner and outer (radial) walls 107 and 109, face walls 111 and 113. Inner and outer rings may be formed from the same or different materials. A fill stem 115 projects from void space 105 into the outer rim. The fill stem is shown in detail in FIG. 6.

The stem 115 is tubular, penetrating wall 107 and projecting into a void portion 117 of outer ring 103. The inside passage 119 is used to convey the thermally expansive material into void 105. The stem is conveniently sealed by pinch welding at the region 121. The stem is crimped and a high current flows to soften and weld the metal.

The invention is susceptible to multiple variations and uses. The material may be a metal when used at high temperatures but may be rubber of other plastic material at lower temperatures. Inert gases are preferred for high temperature operations such as a replacement knife edge, but water and other liquids may be used to take advantage of the great increase in volume which attends transformation from liquid to gas.

The invention has been disclosed in view of specific examples which are not limitative of the scope and spirit of the invention. Modifications apparent to those skilled in the art are encompassed within the disclosure and claims.

We claim:

1. A thermally expansive closed three dimensional structure operable at a selected temperature range comprising:
   a plurality of substantially rigid walls;
   at least one deformable metal wall with respect to said rigid walls at said selected temperature range, said at least one deformable metal wall having a deformed orientation and a non-deformed orientation;
   a sealed void space internal to said structure, said void space impinging upon at least one of said deformable metal walls with respect to said rigid walls; and
   a fluid sealed within said void space, said fluid being selected to function as a perfect gas within said selected temperature range, wherein said fluid is present within said void space when said at least one deformable metal wall is in the non-deformed orientation, wherein in the deformed orientation said fluid contacts said at least one deformable metal wall and wherein said at least one deformable metal wall has a surface that makes up part of a seal upon engaging a rigid inner wall.

2. A thermally expansion structure according to claim 1 which expands irreversibly.

3. A thermally expansive structure according to claim 1 wherein said sealable void space is sealed to entrap said fluid.

4. A thermally expansive structure according to claim 1 which is a ring having a void between inner and outer walls of said ring.

5. A thermally expansive structure according to claim 4 wherein at least a part of the said outer wall is deformable.

6. A thermally expansive structure according to claim 4 wherein at least a part of said inner wall is deformable.

7. A thermally expansive structure according to claim 1 which is in the form of a cylinder and at least one deformable wall is an end.

8. A thermally expansive structure according to claim 1 which is in the form of a face seal wherein at least one deformable side is on a face.

9. A thermally expansive closed three dimensional structure operable at a selected temperature range to function as a modulating valve or shutoff valve comprising:
   a plurality of substantially rigid walls;
   at least one deformable wall with respect to said rigid walls at said selected temperature range, wherein said at least one metal deformable wall has a deformed orientation and a non-deformed orientation, wherein said at least one metal deformable wall defines a passageway therethrough in the non-deformed orientation;
a sealed void space internal to said structure, said void space impinging upon at least one of said deformable metal walls with respect to said rigid walls;
a fluid sealed within said void space, said fluid being selected to function as a perfect gas within said selected temperature range; and
a process fluid flowing through said passageway of said at least one metal deformable wall when said at least one deformable metal wall is in the non-deformed orientation, wherein reorientation of said at least one deformable metal wall to the deformed orientation effects closure of said passageway and reduction or stoppage of the flow of said process fluid.

* * * * *